United States Patent
Kaveri et al.

(10) Patent No.: US 10,949,367 B2
(45) Date of Patent: Mar. 16, 2021

(54) METHOD FOR HANDLING KERNEL SERVICE REQUEST FOR INTERRUPT ROUTINES IN MULTI-CORE ENVIRONMENT AND ELECTRONIC DEVICE THEREOF

(71) Applicant: Samsung Electronics Co., Ltd., Suwon-si (KR)

(72) Inventors: Anup Manohar Kaveri, Bangalore (IN); Nischal Jain, Bangalore (IN); Rohit Kumar Saraf, Bangalore (IN); Samarth Varshney, Bangalore (IN); Shwetang Singh, Bangalore (IN); Vinayak Hanagandi, Bangalore (IN); Srinivasa Rao Kola, Bangalore (IN); Younjo Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/657,718

(22) Filed: Oct. 18, 2019

(65) Prior Publication Data
US 2020/0125510 A1    Apr. 23, 2020

(30) Foreign Application Priority Data

Oct. 18, 2018   (IN) .............................. 201841039487
Sep. 30, 2019   (IN) .............................. 201841039487

(51) Int. Cl.
*G06F 13/24*    (2006.01)
*G06F 9/52*     (2006.01)

(52) U.S. Cl.
CPC .............. *G06F 13/24* (2013.01); *G06F 9/526* (2013.01)

(58) Field of Classification Search
CPC ......... G06F 13/24; G06F 9/526; G06F 9/4812
See application file for complete search history.

(56) References Cited

U.S. PATENT DOCUMENTS 5,274,823 A    12/1993   Brenner et al.
7,565,651 B1    7/2009   Carey
(Continued)

OTHER PUBLICATIONS

International Search Report dated Feb. 11, 2020 in connection with International Patent Application No. PCT/KR2019/013751, 3 pages.
(Continued)

*Primary Examiner* — Glenn A. Auve (57) ABSTRACT

A method for handling kernel services for interrupt routines in a multi-core processor in an electronic device. The method comprises receiving a first interrupt on a first core of the multi-core processor, wherein the first interrupt includes at least one kernel service request and at least one non-kernel service request. The method further determines whether a worker queue of the first core in empty and whether a kernel service lock for the at least one kernel service request is acquired by at least one second core of the multi-core processor, in response to determining that the worker queue of the first core is empty. The method further comprises executing the at least one non-kernel service request of the first interrupt on the first core. The pending kernel service request are queued in the worker queue based on whether worker queue is empty or not and availability of kernel lock.

19 Claims, 9 Drawing Sheets

(56) References Cited

U.S. PATENT DOCUMENTS

| | | |
|---|---|---|
| 7,685,391 B1 | 3/2010 | Cholleti et al. |
| 2006/0161921 A1 | 7/2006 | Kissell |
| 2012/0089761 A1* | 4/2012 | Ryu .................. G06F 11/20 |
| | | 710/267 |
| 2012/0192194 A1 | 7/2012 | Richardson |
| 2013/0054859 A1* | 2/2013 | Berezecki ............ G06F 13/24 |
| | | 710/264 |
| 2014/0281243 A1* | 9/2014 | Shalf .................. G06F 12/0842 |
| | | 711/122 |
| 2017/0103031 A1* | 4/2017 | Liu .................... G06F 13/24 |

OTHER PUBLICATIONS

Written Opinion of the International Searching Authority dated Feb. 11, 2020 in connection with International Patent Application No. PCT/KR2019/013751, 5 pages.

\* cited by examiner

FIG.1

(Prior Art)

METHOD FOR HANDLING KERNEL SERVICE REQUEST FOR INTERRUPT ROUTINES IN MULTI-CORE ENVIRONMENT AND ELECTRONIC DEVICE THEREOF

CROSS-REFERENCE TO RELATED APPLICATION

This application is based on and claims priority under 35 U.S.C. § 119 to India Patent Application No. 201841039487 filed on Oct. 18, 2018 and India Patent Application No. 201841039487 filed on Sep. 30, 2019, the disclosures of which are herein incorporated by reference in their entirety.

BACKGROUND

1. Field

The disclosure relates to interrupt handling, and more specifically relates to a method and system for handling kernel service request for interrupt routines in multi-core environment.

2. Description of Related Art

An interrupt is a signal to the processor by an external device or software to immediately process an event that has occurred, for example: keystrokes on the keyboard, or data on Ethernet card. When an interrupt occurs, central processing unit (CPU) suspends the current running process and starts executing a special program to handle the interrupt called interrupt service routine (ISR). During this ISR execution, no other interrupts can occur.

Figure 1:
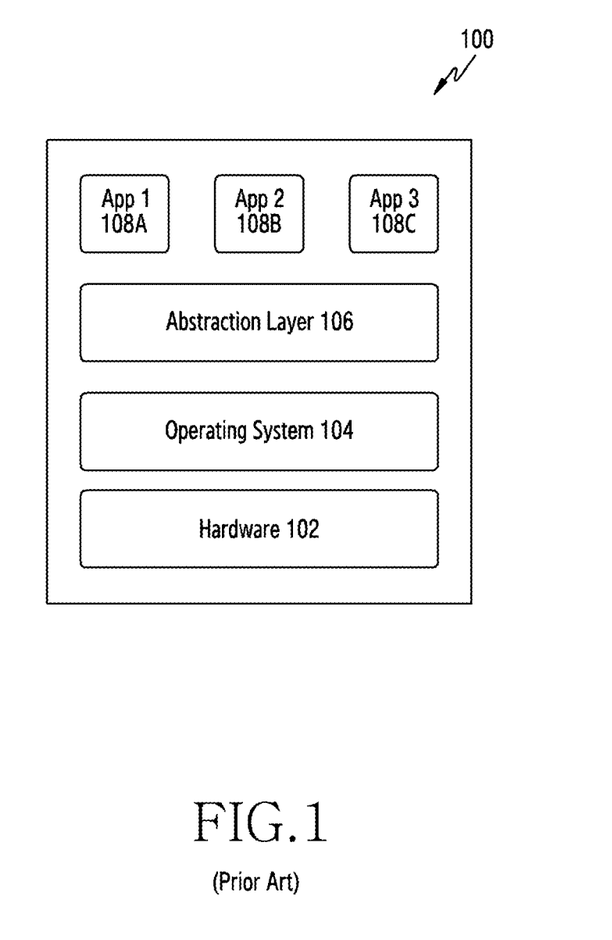
FIG. 1 illustrates a block diagram of a multi-core processor, according to the prior art.

FIG. 1 illustrates a block diagram 100 comprising a multi-core operating system (OS) 104, hardware 102, an abstraction layer 106 and plurality of applications running such as applications (APPs) 108A, 108B and 108C. The main responsibility of OS 104 is to facilitate services for resource allocation, protection, task synchronization and inter task communication. A kernel implements and executes the above services known as kernel services. The kernel services can be requested by tasks as well as special routines called interrupt service routines (ISR) for handling an interrupt. With increasing processing demand real time operating systems are being extended to multi-cores which provide scope for parallel execution and thus increase the overall processing capability of the processors. The extension also applies for routing of interrupts to different cores and their parallel execution as well.

Figure 2:
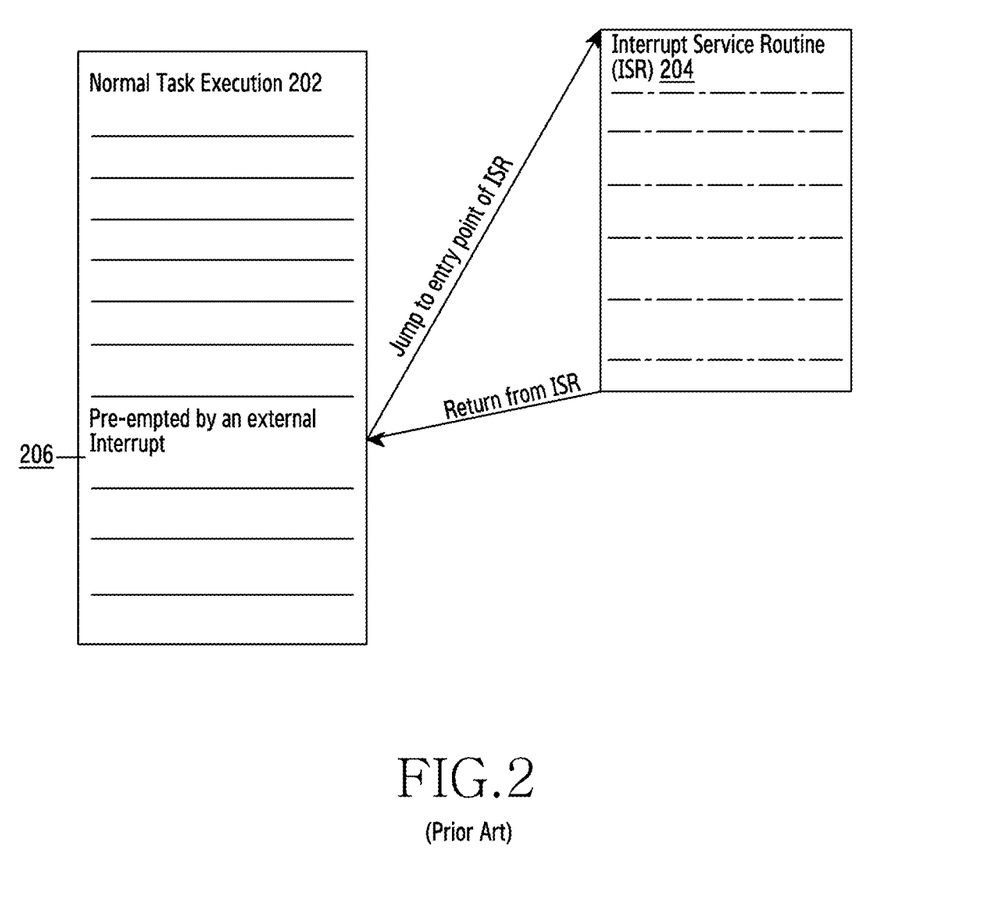
FIG. 2 illustrates a schematic diagram of a task execution on receiving an interrupt, according to the prior art.

FIG. 2 illustrates a schematic diagram of the conventional execution of task when an interrupt is received. In FIG. 2, block 202 denotes normal execution of task and block 204 denotes the ISR. At 206, an interrupt is received and the normal task execution is preempted by the interrupt. After preemption by the interrupt, the CPU jumps to the entry point of the ISR 204 and start executing the ISR 204. After handling the interrupt that is after execution of the ISR 204 the CPU restores its state and continues its work from a last instruction executed before the ISR execution. Therefore, it is very important for the ISR to execute as efficiently as possible and not block interrupts and normal task execution for too long.

Further, in a multi-core environment, due to parallel processing, a scenario of receiving kernel service requests at the same time by interrupts over different cores of a multi-core processor is very common. However, due to shared kernel data structure, only one kernel service is allowed to run at a time, while all other kernel service requests are made to wait for the running kernel instance to finish. This heavily wastes CPU cycles and the interrupt latency also gets affected.

Figure 3:
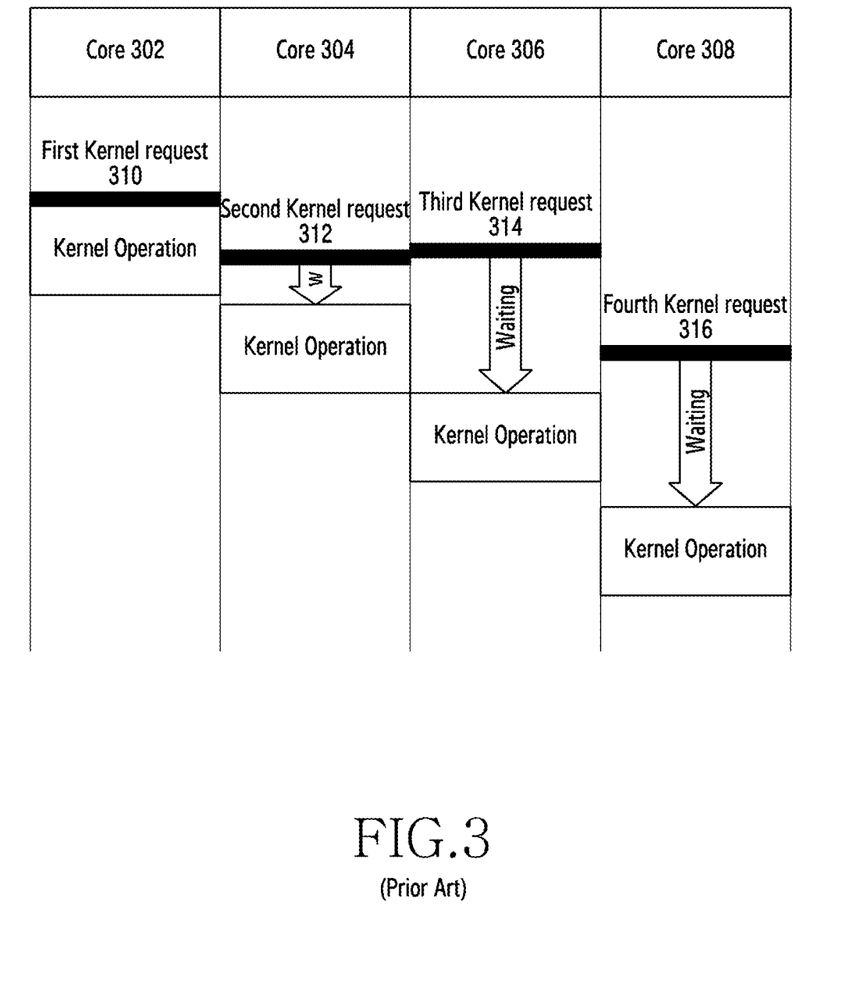
FIG. 3 illustrates a schematic diagram of the wait time for plurality of kernel service request on different cores, according to the prior art.

FIG. 3 illustrates a schematic diagram of the wait time for plurality of kernel service request on different cores, according to the prior art. As seen in FIG. 3, there are four cores, core 302, core 304, core 306 and core 308. Each core receives a kernel service request by the interrupts. The core 302 receives a first kernel service request 310. The first kernel service request is executed immediately as the core is available for any kernel operations. A second kernel service request 312 is received by the core 304 from the interrupt during the execution of the first kernel service 310. Because the kernel is busy executing the first kernel service request 310, the second kernel service request 312 has to wait till the completion of the first kernel service request 310. Similarly, a third kernel service request 314 and a fourth kernel service request 316 are received on the core 306 and the core 308 respectively. The wait time for the fourth kernel service request 316 is more as they have to wait for execution of first, second and third kernel service requests 310, 312 and 314. Thus, there is a wastage in the CPU cycle and also the interrupt latency is increased.

Thus, it is desired to address the above mentioned disadvantages or other shortcomings or at least provide a useful alternative.

SUMMARY

An embodiment is to provide a method for handling kernel services for interrupt routines in a multi-core processor of an electronic system.

Another embodiment is to acquire the kernel service lock for the at least one kernel service request in a context-less worker thread on the core.

Another embodiment is to queue the kernel service request for which the kernel lock is unavailable into a worker queue for later execution inside the context-less worker thread.

Another embodiment is to execute the at least one kernel service request of first interrupt inside the context-less worker thread on the core.

Another embodiment is to determine that the worker queue is empty.

Accordingly, the embodiments herein disclose a method for handling kernel services for interrupt routines in a multi-core processor of an electronic system. The method comprises receiving a first interrupt on a first core of the multi-core processor, wherein the first interrupt includes at least one kernel service request and at least one non-kernel service request. The method further includes determining that a kernel service lock for the at least one kernel service request is acquired by one of the first core and at least one second core of the multi-core processor. The method further comprises executing the at least one non-kernel service request of the first interrupt on the first core by the electronic device. Further, the at least one kernel service request for which the kernel lock is unavailable is queued into a worker queue of the first core for later execution inside a context-less worker thread.

In an embodiment, the method further comprises receiving, by the electronic device, a second interrupt on the first core of the multi-core processor, wherein the second interrupt includes at least one kernel service request and at least one non-kernel service request. The electronic device determines that the kernel service lock for the at least one kernel service request is acquired by one of the first core and at least one second core of the multi-core processor. The electronic device executes the at least one non-kernel service request of the second interrupt on the first core. The at least one kernel service request for which the kernel lock is unavailable is queued into the worker queue of the first core for later execution inside the context-less worker thread.

In an embodiment, the method further includes determining, by the electronic device, that the kernel service lock for the at least one kernel service request is available and retrieving the at least one kernel service request from the worker queue. The method further includes acquiring the kernel service lock for the at least one kernel service request in the context-less worker thread on the first core and executing the at least one kernel service request of the first interrupt inside the context-less worker thread on the first core. The method further includes determining that the worker queue is empty and switching back to the next instruction to the last instruction after which interrupt routine was triggered In an embodiment the context-less worker thread is used to dequeue and execute at least one kernel service request from the worker queue. The kernel service requests for which the kernel lock are unavailable during the execution inside the interrupt context are queued to the worker queue for later execution inside the worker thread.

In another embodiment the context-less worker thread executes the queued kernel services in the worker queue on behalf of at least one interrupt handler.

In yet another embodiment the worker thread provides an interrupt-enabled environment to allow for processing of any waiting interrupts.

In an embodiment the method for handling kernel services for interrupt routines in a multi-core processor comprises receiving a first interrupt on at least one core of the multi-core processor, wherein the interrupt includes a plurality of kernel service request and a plurality of non-kernel service requests. The method further includes determining that a kernel service lock for at least one first kernel service request from the plurality of kernel service requests is available and a kernel service lock for at least one second kernel service request from the plurality of kernel service requests is unavailable. The method further includes queuing the at least one second kernel service request for which the kernel lock is unavailable into a worker queue for later execution inside a context-less worker thread. Further the electronic device executes the at least one non-kernel service request and the at least one first kernel service request of the interrupt on the core.

In an embodiment the disclosure provides a method for providing low latency kernel services for Interrupt routines in a Multi-Core processor of an electronic device. The method comprises detecting, by the electronic device that a first Interrupt has been received by at least one core, wherein the first Interrupt includes a first plurality of kernel service calls and a first plurality of hardware instructions. The method also includes suspending, by the electronic device a function currently running on the at least one core and pre-empting the first Interrupt on the at least one core. The method further includes detecting, by the electronic device availability of kernel service locks for a first set of kernel service calls and unavailability of kernel service locks for a second set of kernel services calls required for executing the interrupt. The method also includes queueing by the electronic device, the second set of kernel service calls for which the Kernel Service locks are not available in a worker queue; and executing by the electronic device the first set of Kernel service calls and the first plurality of hardware instructions.

The method also comprises detecting, by the electronic device that a second Interrupt has been received to the least one core, wherein the second interrupt includes a second plurality of kernel service calls and a second plurality of Hardware Instructions, detecting, by the electronic device availability of kernel service locks for a third set of kernel service calls and unavailability of kernel service locks for a fourth set of kernel services calls required for executing the Interrupt, queueing, by the electronic device the third set of Kernel Service Calls in the Worker Queue; and executing, by the electronic device the fourth set of Kernel Service Calls and the second plurality of Hardware Instructions.

The method further comprises detecting, by the electronic device that no interrupt is currently executing on the at least one core, detecting, by the electronic device that kernel service lock for at least one kernel service call is available; and executing, by the electronic device the at least one kernel service Call by acquiring the Kernel Service lock for the at least one Kernel Service Call in the Worker Thread.

In an embodiment queueing the second set of kernel service calls in the worker queue is done in first-in-first-out nature and queueing the third set of kernel service calls in the worker queue is done in first-in-first-out nature. In another embodiment execution of the at least one Kernel Service includes context-less execution and context-based execution.

Accordingly, the embodiments herein disclose an electronic device for handling kernel services for interrupt routines in a multi-core processor. The electronic device comprises a memory configured to store information about kernel services, a multi-core processor comprising a plurality of cores and a context-less worker controller, coupled to the memory and the multi-core processor. The context-less worker controller further comprises an interrupt handler, a kernel service request queue manager and a kernel service request lock determiner. The interrupt controller receives a first interrupt on a first core of the multi-core processor, wherein the first interrupt includes at least one kernel service request and at least one non-kernel service request. The kernel service lock determiner, determines that a kernel service lock for the at least one kernel service request is acquired by one of the first core and at least one second core of the multi-core processor. The electronic device executes the at least one non-kernel service request of the first interrupt on the first core. The at least one kernel service request for which the kernel lock is unavailable is queued by the kernel service request queue manager into a worker queue of the first core for later execution inside a context-less worker thread.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The embodiments herein and the various features and advantageous details thereof are explained with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method and an apparatus for handling kernel services for interrupt routines in a multi-core processor of an electronic system. The method receives a first interrupt on a first core of the multi-core processor, wherein the first interrupt includes at least one kernel service request and at least one non-kernel service request. The electronic device determines that a kernel service lock for the at least one kernel service request is acquired by one of the first core or at least one second core of the multi-core processor. The electronic device executes the at least one non-kernel service request of the first interrupt on the first core. The at least one kernel service request for which the kernel lock is unavailable is queued into a worker queue of the first core for later execution inside a context-less worker thread.

Referring now to the drawings, and more particularly to FIG. 4-FIG. 9, where similar reference characters denote corresponding features consistently throughout the figures, there are shown preferred embodiments.

Figure 4:
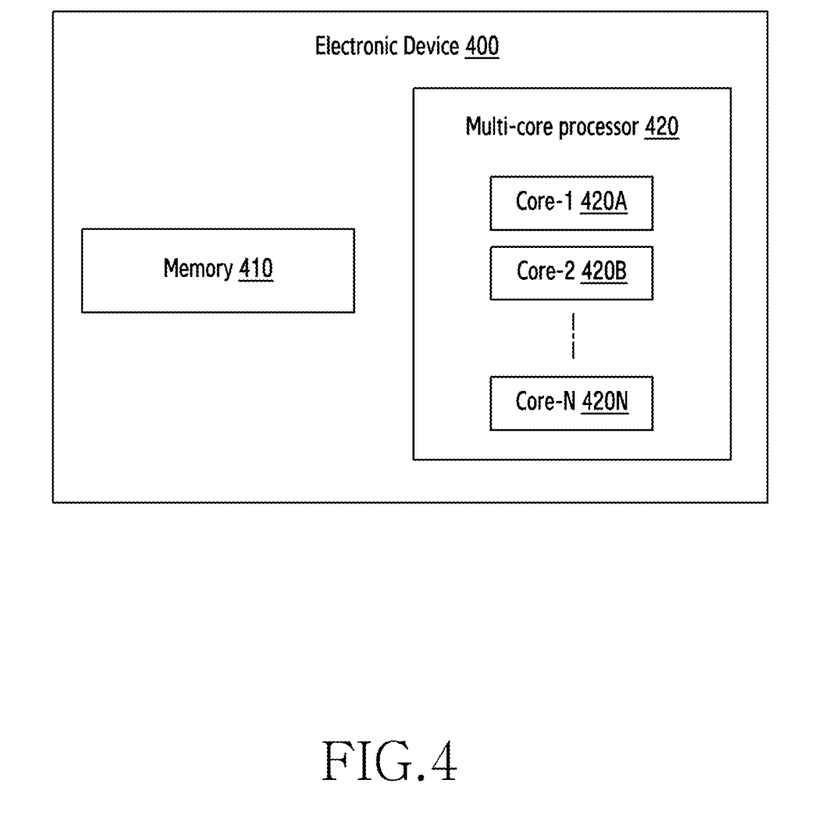
FIG. 4 illustrates a block diagram of an electronic device for handling kernel services for interrupt routines in a multi-core processor environment, according to the embodiments as disclosed herein.

FIG. 4 illustrates a block diagram of an electronic device 400 for handling kernel services for interrupt routines in a multi-core processor environment, according to the embodiments as disclosed herein. In an embodiment, the electronic device 400 includes a memory 410 connected to a multi-core processor 420. The multi-core processor 420 comprises a plurality of cores 420A to 420N.

The electronic device 400 can be, for example but not limited to, a cellular phone, a tablet, a smart phone, a laptop, a personal digital assistant (PDA), a global positioning system, a multimedia device, a video device, an internet of things (IoT) device, smart watch, a game console, or the like. The electronic device 400 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The electronic device 400 is compliant with multiple, different communication protocols that can operate as a multi-mode device by communicating within the 5G system.

In an embodiment, the electronic device 400 may receive one or more interrupts on a first core of the plurality of cores 420A to 420N of the multi-core processor 420. The one or more interrupts may comprise a plurality of non-kernel services request and a number of kernel services requests. In an embodiment the kernel service request for example may be, but not limited to a portion of a code that can be executed only inside the kernel lock. Further, the non-kernel service request for example may be, but not limited to a portion of a code that can run independently without any need for lock.

Figure 5:
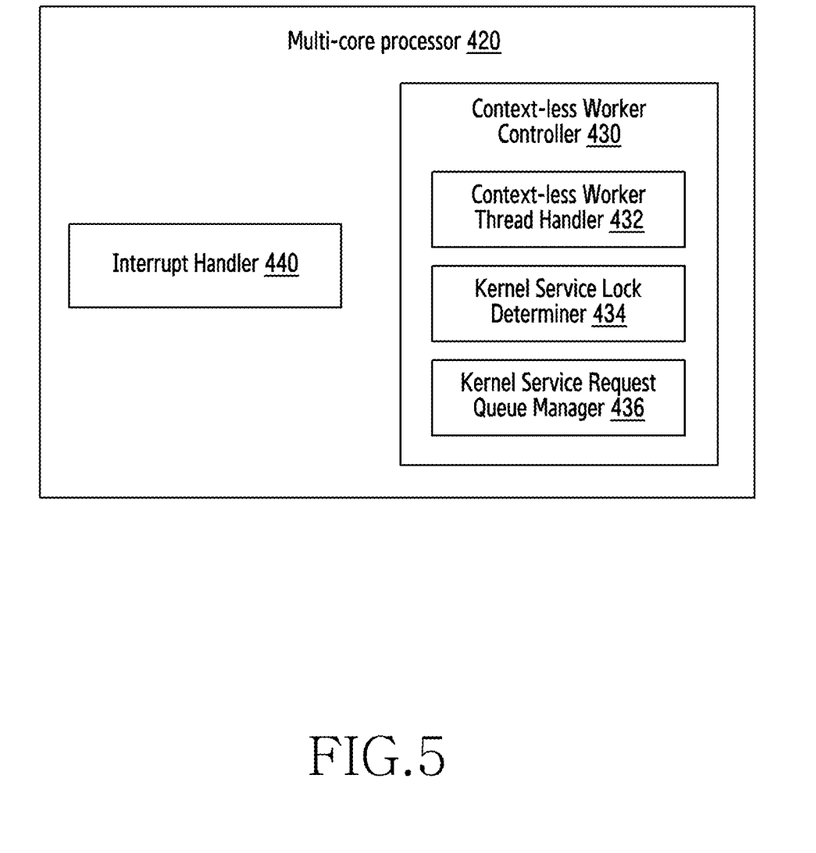
FIG. 5 illustrates a block diagram of a multi-core processor and context-less worker controller for handling kernel services for interrupt routines in a multi-core processor environment, according to the embodiments as disclosed herein.

FIG. 5 illustrates a block diagram of the multi-core processor 420 for handling kernel services for interrupt routines, according to the embodiments as disclosed herein. As can be seen in FIG. 5, the multi-core processor 420 comprises an interrupt handler 440 and a context-less worker controller 430. The context-less worker controller 430 comprises a context-less worker thread handler 432, a kernel service lock determiner 434, and a kernel service request queue manager 436.

In an embodiment, the interrupts received on the electronic device 400 are handled by the interrupt handler 440 and the context-less worker controller 430. After receiving the one or more interrupt on the first core of the plurality of cores 420A to 420N, the kernel service lock determiner 434 determines whether a worker queue is empty or not. The kernel service lock determiner 434 then determines the availability of the kernel for executing the kernel services. In an example scenario, a kernel of the multi-core processor 420 may be acquired by any one of the plurality of core 420A to 420N for execution of a task or for performing other kernel services, then in such case the kernel lock is referred to be unavailable for execution of the kernel service request. In another scenario, the kernel may be free, in such case the kernel lock is referred to be available for execution of the kernel service request.

After determining the availability of the kernel lock, the interrupt handler 440 executes the non-kernel service request of the one or more interrupt on the first core of the plurality of cores 420A to 420N. The electronic device 400 also executes the kernel service request for which the kernel lock is available. If the kernel lock is unavailable for the execution of the kernel service request then the interrupt handler 440, queues the number of kernel service request for which the kernel lock is unavailable into the worker queue of the first core for later execution inside a context-less worker thread. The context-less worker thread may be understood as an OS independent execution of thread. The context-less worker thread is responsible for executing the buffered kernel services on behalf of the requesting interrupt handlers. The context-less worker thread offers an interrupt enabled environment to allow for processing of other waiting interrupts. Moreover, switching to and from the context-less worker thread has minimal overhead due to its context-less nature.

In an embodiment the worker queue is a queue maintained by each of the plurality of cores 420A to 420N for buffering the kernel service request for which the kernel lock is unavailable. The worker queue is dequeued inside the context less worker thread. The context-less worker thread is a special thread that does not saves its context when it gets preempted i.e. unlike normal threads which after getting preempted always resumes back to the location where they were last preempted, the context less worker thread after getting preempted will resumes back to its initial starting execution point and not to the location where it was last preempted. Further, the context-less worker thread executes the kernel service request present in the worker queue. The worker thread provides an interrupt-enabled environment to allow execution of queued kernel service requests.

Figure 6:
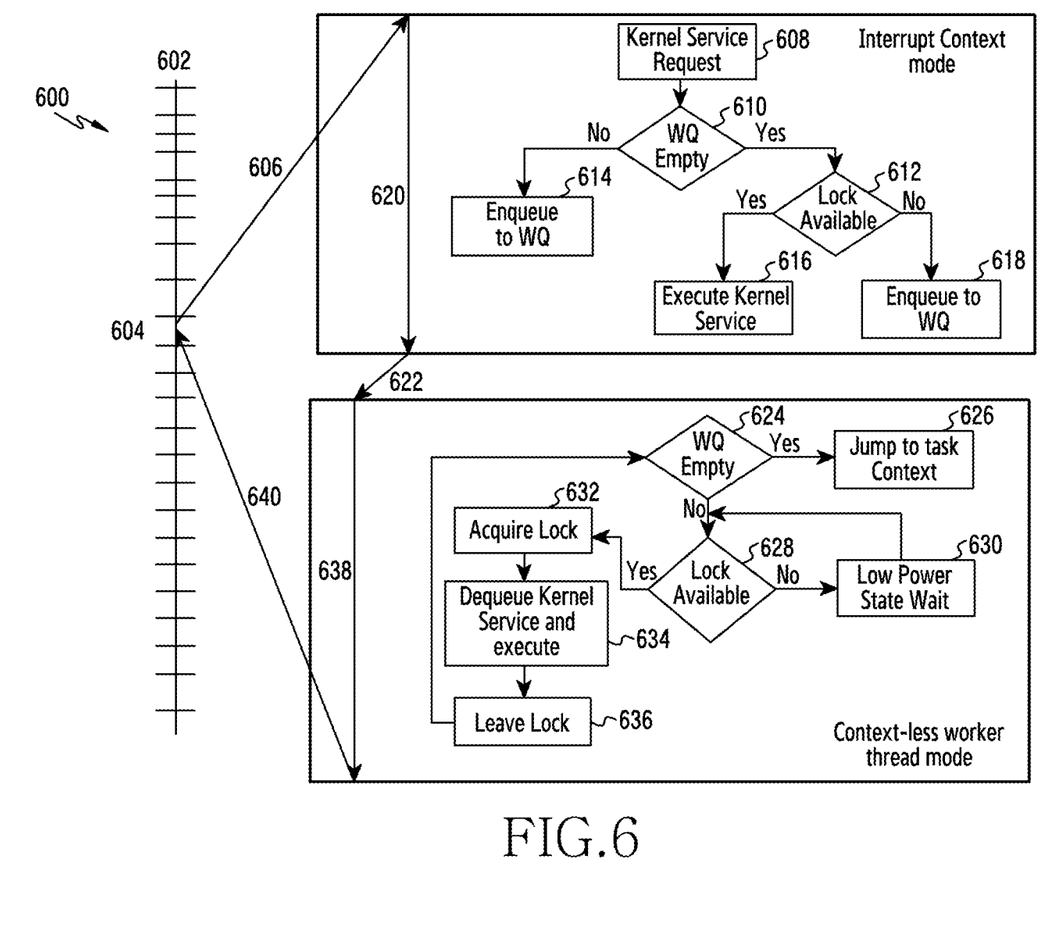
FIG. 6 illustrates a flow diagram of the proposed method for handling kernel services for interrupt routines in a multi-core processor environment, according to the embodiments as disclosed herein.

FIG. 6 illustrates a flow diagram 600 of the proposed method for handling kernel services for interrupt routines in a multi-core processor environment. Further as seen in FIG. 6, there is the interrupt context mode, context less worker thread mode and a task context mode. Inside Interrupt context mode interrupts are kept disabled thus enforcing the system that no preemption can happen to the current flow of execution. All interrupt handlers run inside the Interrupt context mode. The context less worker thread mode differs from task context mode in sense that whenever the execution flow in task context is preempted its context is saved whereas in context less worker thread no context is saved at the time of preemption.

As seen in the FIG. 6, 602 denote the normal execution of the multi-core processor 420 of the electronic device 400, working in a task context mode. At 604 the interrupt is received by at least one core of the plurality of cores 420A to 420N. After receiving the interrupt, the interrupt handler 440 goes into an interrupt context mode as shown by arrow 606.

After entering the interrupt context mode, at 610 the interrupt handler 432 determines whether the worker queue is empty. In an embodiment the worker queue may be filled with kernel service request received previously from other interrupts for which the kernel lock is unavailable. Further the flow proceeds to 612 if the worker queue is empty and to 614 if the worker queue is not empty. At 612, the kernel service lock determiner 434 determines whether the kernel lock is available or not for execution of the kernel service request from the interrupts. The method proceeds to step 616 if the kernel lock is available and to step 618 if the kernel lock is unavailable. At 616, where the kernel lock is available the interrupt handler 432 will execute the received kernel service request. At 618 where the kernel lock is unavailable the interrupt handler 440 will enqueue the received kernel service request to the worker queue. Arrow 620 denotes the working happening in the interrupt context mode. The flow 600 now moves to context-less worker thread from interrupt context mode as shown by arrow 622.

At 624 the context less worker controller 430 determines whether the worker queue is empty. The flow proceeds to 626 if the worker queue is empty and to 628 if the worker queue is not empty. At 626 the mode will be changed to the task context mode. At 628 the kernel service lock determiner 434 determines whether the kernel lock is available or not for execution of the kernel service request from the interrupts. The method proceeds to step 632 if the kernel lock is available and to step 630 if the kernel lock is unavailable. At 630, where the kernel lock is unavailable the pending kernel service request will go into low power state and wait for availability of kernel lock for execution. At 632 where the kernel lock is unavailable the context less worker thread handler 432 will acquire the lock. At 634 the context less worker thread handler 432 will de-queue the kernel service request and execute the pending kernel service request inside the worker queue. At 636 the context less worker thread handler 432 will release the kernel lock after execution of the kernel service request and will go back to 624. Arrow 638 denotes the working happening in the context-less worker thread mode. The flow 600 now moves to the text context mode from context-less worker thread mode and resume nor task execution as shown by arrow 640. Thus, the pending kernel service request gets executed inside the worker thread by the context less worker thread handler 432.

Figure 7:
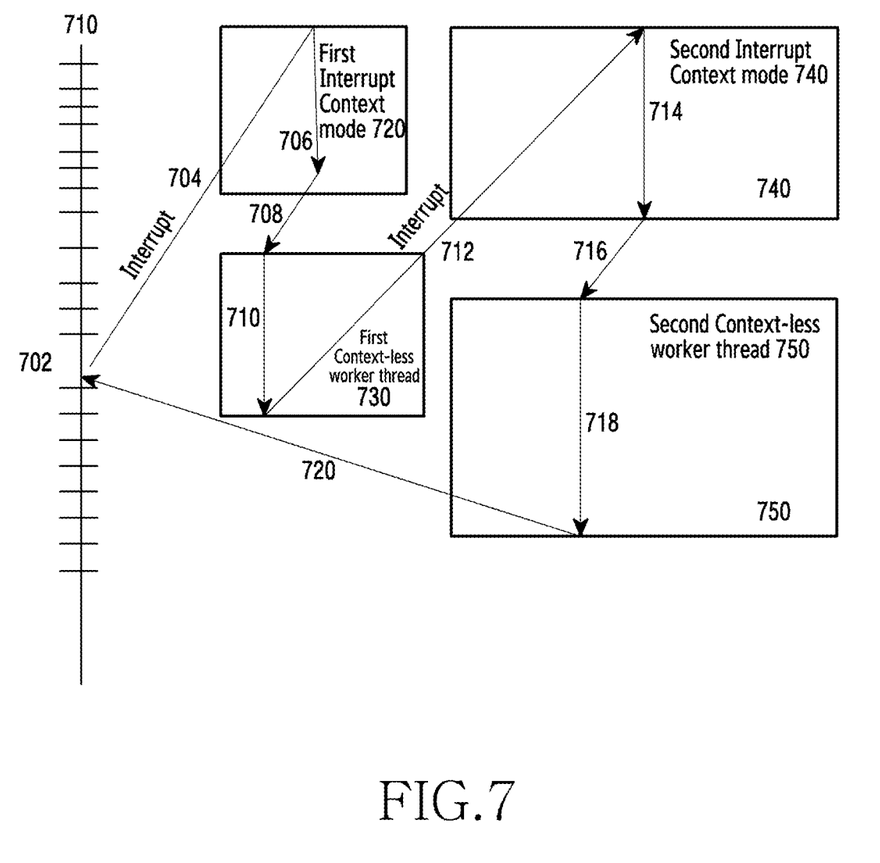
FIG. 7 illustrates a flow diagram of the proposed method for handling kernel services for multiple interrupts in a multi-core processor environment, according to the embodiments as disclosed herein.

FIG. 7 illustrates a sequence diagram, illustrating the handling of multiple kernel service requests from the interrupts, according to the embodiments as disclosed herein. As seen in FIG. 7, 710 represent the normal execution of task in a task mode (not shown in FIG. 7). Further, FIG. 7 shows a first interrupt context mode 720, a first context-less worker thread 730, a second interrupt context mode 740 and a second context-less worker thread 750. In an example scenario, the interrupt is received by the electronic device 400 at 702. The interrupt handler 440 goes into the first interrupt context mode as denoted by arrow 704. In the first interrupt context mode 720, the interrupt handler 440 determines whether the worker queue is empty. If the worker queue is not empty, then the interrupt handler 440 en-queues the kernel service request to the worker queue. If the worker queue is empty, the kernel service lock determiner 434 determines whether the kernel lock is available or not for execution of the kernel service request from the interrupts. If the kernel lock is available, the interrupt will execute the received kernel service request and if the kernel lock is unavailable the kernel service request queue manager will en-queue the received kernel service request to the worker queue. Arrow 706 denotes the working happening in the interrupt context mode. The flow now moves to the first context-less worker thread 730 from the first interrupt context mode 720 as shown by arrow 708.

After entering the first context less worker thread 730, the context less worker thread handler 432 determines whether the worker queue is empty. If the worker queue is empty, the mode will be changed to task context. If the worker queue is not empty, then the kernel service lock determiner 434 determines whether the kernel lock is available or not for execution of the kernel service request from the interrupts. If the lock is unavailable the pending kernel service request will go into low power state and wait for availability of kernel lock for execution. Whereas if the kernel lock is available and the context less worker thread handler 432 will acquire the lock, de-queue the kernel service request and execute the pending kernel service request inside the worker queue. Then the context less worker thread handler 432 again starts determining whether the worker queue is empty and the process inside the context-less worker thread mode is followed. Arrow 710 denotes the working happening in the context-less worker thread mode.

In an embodiment another interrupt is received by the electronic device while first worker thread was executing thus moving execution flow to interrupt context 740 and the second context-less worker thread 750 denoted by arrows 712, 714, 716 and 718. Once the worker queue is empty, and all the pending kernel service requests are executed then the flow moves to normal execution in the task context mode denoted by arrow 720.

Figure 8:
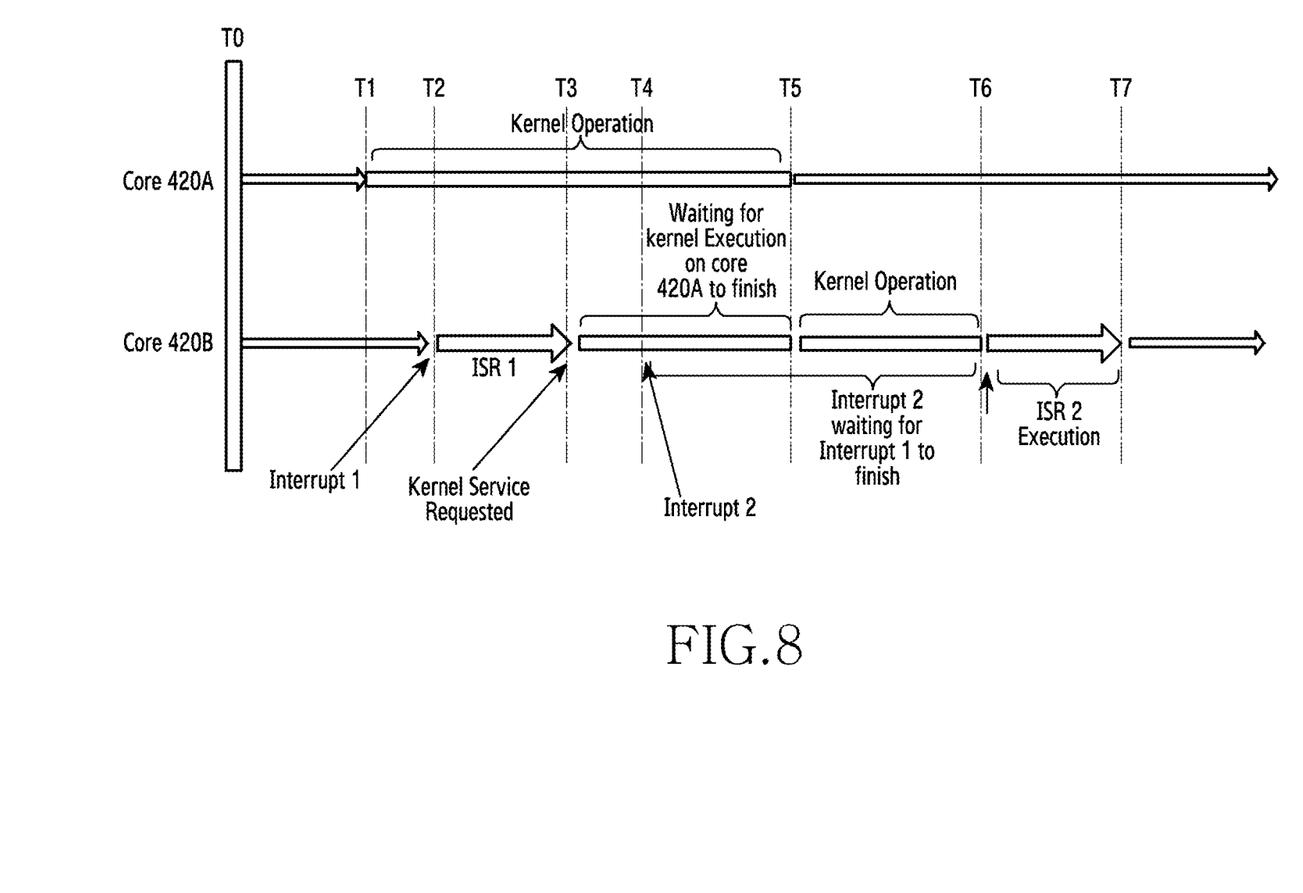
FIG. 8 illustrates a timing diagram of the handling of multiple kernel service request from the interrupts, according to the prior art.

FIG. 8 illustrates a timing diagram of the time taken for execution of kernel service request by interrupts for conventional methods. FIG. 8 shows operation on two cores 420A and 420B of the plurality of cores of the multi-core processor 420. On the core 420A a kernel service request is received at T1. The core 420A acquires the kernel lock and executes the received kernel operation from T1 to T5. On the other hand, on the core 420B the first interrupt is received at T2 and the kernel service is requested inside first interrupt handler at T3. The core 420B then receives the second interrupt at T4. Now as the kernel lock is already acquired on the core 420A, the kernel service request received on core 420B and the second interrupt received at T2 has to wait till the kernel lock is freed from core 420A. Once the kernel lock is free at T5, the kernel service requested by the first interrupt and hence the first interrupt on core 420B is executed till T6. Now the second interrupt has to wait till the execution of the first interrupt on the core 420B is completed. This waiting of the interrupt results into wastage of machine cycles. The execution of the second interrupt begins at T6 and continues till T7. Thus even though the second interrupt was received at T4, it has to wait till T6 because of increased execution time of first interrupt which was due to wait for the kernel lock for its kernel request.

Figure 9:
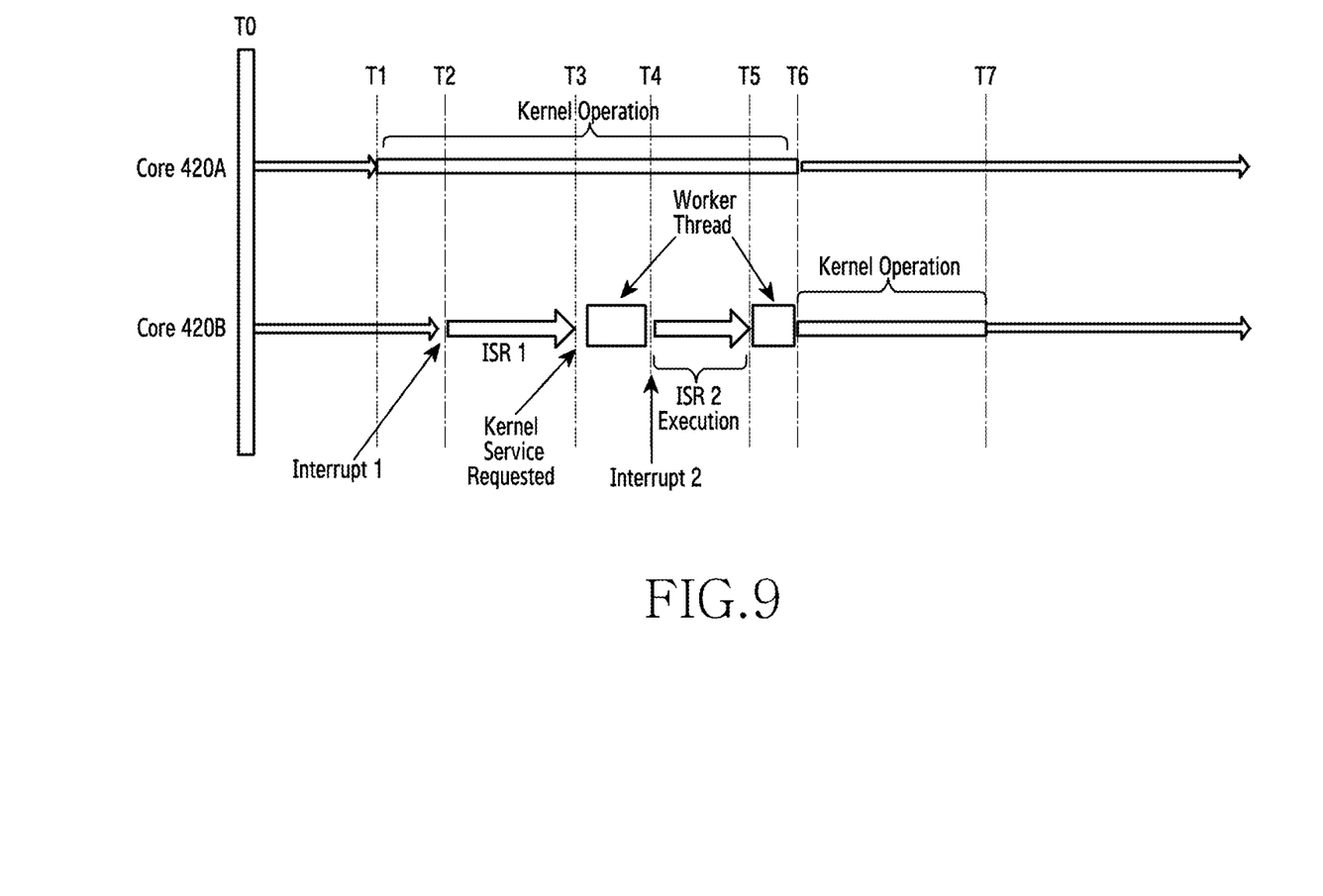
FIG. 9 illustrates a timing diagram of the handling of multiple kernel service request from the interrupts, according to the embodiments as disclosed herein.

FIG. 9 illustrates a timing diagram of the time taken for execution of kernel service request by interrupts for the proposed method. FIG. 9 shows operation on two cores 420A and 420B of the plurality of cores of the multi-core processor 420. On the core 420A, a kernel service request is received at T1. The core 420A executes the received kernel operation from T1 to T6. On the other hand, on the core 420B the first interrupt is received at T2 and the kernel service is requested by the first interrupt. At the core 420B, the non-kernel service request of the first interrupt are executed and kernel service is queued from T2 to T3. After execution of the first interrupt, the worker thread handler at T3 tries to dequeue and execute kernel service request from the worker queue but in unable to do so because the kernel lock is still acquired by core 420A. At T4, the second interrupt is received on the core 420B and it preempts the worker thread. The second interrupt runs from T4 to T5. At T5, execution flow goes to worker thread and it checks for queued kernel services inside the worker queue. At T6, when lock is released by the core 420A, the worker thread dequeues the kernel service from the worker queue and executes it from T6 to T7. As seen in the proposed method, while executing inside the interrupt context the non-kernel services are being executed and the kernel service is queued to the worker queue due to unavailability of lock. Thus the proposed method saves the machine cycle as well as reduces the interrupt latency and improves overall system responsiveness.

The embodiments disclosed herein can be implemented using at least one software program running on at least one hardware device and performing network management functions to control the elements.

Although the disclosure has been described with various embodiments, various changes and modifications may be suggested to one skilled in the art. It is intended that the disclosure encompass such changes and modifications as fall within the scope of the appended claims.

What is claimed is:

1. A method for operating an electronic device including a multi-core processor, the method comprising:
    executing a first non-kernel service request of a first interrupt on a first core of the multi-core processor, wherein the first interrupt includes a first kernel service request and the first non-kernel service request; and
    executing a second non-kernel service request of a second interrupt on the first core of the multi-core processor, wherein the second interrupt includes a second kernel service request and the second non-kernel service request, before executing the first kernel service request, in case that a kernel service lock for the first kernel service request is acquired by at least one second core of the multi-core processor.

2. The method of claim 1, wherein the executing of the first non-kernel service request comprises,
    receiving the first interrupt on the first core of the multi-core processor;
    determining whether a worker queue of the first core of the multi-core processor is empty;
    determining whether the kernel service lock for the first kernel service request is acquired by at least one second core of the multi-core processor, in response to determining that the worker queue of the first core of the multi-core processor is empty;
    executing the first non-kernel service request of the first interrupt on the first core of the multi-core processor; and
    queuing the first kernel service request.

3. The method of claim 2, wherein the queuing of the first kernel service request comprises one of:
    queuing the first kernel service request, in response to determining that the worker queue is empty and the kernel service lock for the first kernel service request is unavailable, into the worker queue of the first core of the multi-core processor for later execution inside a context-less worker thread; or
    queuing the first kernel service request, in response to determining that the worker queue of the first core of the multi-core processor is not empty.

4. The method of claim 3, wherein the context-less worker thread executes the queued first kernel service request in the worker queue on behalf of at least one interrupt handler.

5. The method of claim 3, wherein the context-less worker thread provides an interrupt-enabled environment to allow for processing of any waiting interrupts.

6. The method of claim 2, further comprising:
    determining that the worker queue of the first core of the multi-core processor is not empty;
    determining that the kernel service lock for the first kernel service request is available, in response to determining that the worker queue of the first core of the multi-core processor is not empty;
    retrieving the first kernel service request from the worker queue of the first core of the multi-core processor, in response to determining that the kernel service lock for the first kernel service request is available;
    acquiring the kernel service lock for the first kernel service request in a context-less worker thread on the first core of the multi-core processor; and
    executing the first kernel service request of the first interrupt inside the context-less worker thread on the first core of the multi-core processor.

7. The method of claim 6, further comprising:
    determining that the worker queue of the first core of the multi-core processor is empty; and
    switching back to a task context of a system.

8. The method of claim 2, wherein the executing of the second non-kernel service request comprises,
    receiving the second interrupt on the first core of the multi-core processor;
    determining whether the worker queue of the first core of the multi-core processor is empty;
    determining whether a kernel service lock for the second kernel service request is acquired by the at least one second core of the multi-core processor, in response to determining that the worker queue of the first core of the multi-core processor is empty;
    executing the second non-kernel service request of the second interrupt on the first core of the multi-core processor; and
    queuing the second kernel service request.

9. The method of claim 8, wherein the queuing of the second kernel service request comprises one of:
    queuing the second kernel service request, in response to determining that the worker queue is empty and the kernel service lock for the second kernel service request is unavailable, into the worker queue of the first core of the multi-core processor for later execution inside a context-less worker thread; or
    queuing the second kernel service request, in response to determining that for the worker queue of the first core of the multi-core processor is not empty.

10. A method for handling kernel services for interrupt routines in a multi-core processor of an electronic device, the method comprising:
    receiving an interrupt on a first core of the multi-core processor, wherein the interrupt includes a plurality of kernel service requests and a plurality of non-kernel service requests;

determining that a worker queue is empty and that a kernel service lock for at least one first kernel service request from the plurality of kernel service requests is available;

determining that the worker queue is not empty and that a kernel service lock for at least one second kernel service request from the plurality of kernel service requests is unavailable;

queuing the at least one second kernel service request for which the kernel service lock is unavailable into the worker queue for later execution inside a context-less worker thread; and executing at least one non-kernel service request and the at least one first kernel service request of the interrupt on the first core of the multi-core processor.

11. The method of claim 10, wherein executing the at least one non-kernel service request and the at least one first kernel service request of the interrupt on the first core of the multi-core processor comprises:

executing the at least one non-kernel service request;

acquiring the kernel service lock for the at least one first kernel service request on the first core of the multi-core processor; and executing the at least one first kernel service request of the interrupt.

12. The method of claim 10, further comprising:

determining that the kernel service lock for the at least one second kernel service request is available;

dequeueing the at least one second kernel service request from the worker queue;

acquiring the kernel service lock for the at least one second kernel service request in the context-less worker thread on the first core of the multi-core processor; and executing the at least one second kernel service request of the interrupt inside the context-less worker thread on the first core of the multi-core processor.

13. The method of claim 12, further comprising:

determining that the worker queue is empty; and switching back to a task context of a system.

14. The method of claim 10, wherein the context-less worker thread executes the queued at least one second kernel service request in the worker queue on behalf of at least one interrupt handler.

15. An electronic device for handling kernel services for interrupt routines in a multi-core processor, the electronic device comprising:

a memory configured to store information about kernel services;

a multi-core processor comprising a plurality of cores and configured to:

receive a first interrupt on a first core of the multi-core processor, wherein the first interrupt includes at least one kernel service request and at least one non-kernel service request;

determine whether a worker queue of the first core of the multi-core processor is empty;

determine whether a kernel service lock for the at least one kernel service request is acquired by one of the first core or at least one second core of the multi-core processor; and execute the at least one non-kernel service request of the first interrupt on the first core of the multi-core processor; and wherein the electronic device is configured to perform one of:

queue the at least one kernel service request, in response to determining that the worker queue is empty and the kernel service lock for the at least one kernel service request is unavailable, into the worker queue of the first core of the multi-core processor for later execution inside a context-less worker thread; or queue the at least one kernel service request, in response to determining the worker queue of the first core of the multi-core processor is not empty.

16. The electronic device of claim 15, further configured to:

receive a second interrupt on the first core of the multi-core processor, wherein the second interrupt includes at least one kernel service request and at least one non-kernel service request;

determine whether the worker queue of the first core of the multi-core processor is empty;

determine whether the kernel service lock for the at least one kernel service request of the second interrupt is acquired by one of the first core or at least one second core of the multi-core processor;

execute the at least one non-kernel service request of the second interrupt on the first core of the multi-core processor;

queue the at least one kernel service request, in response to determining that the worker queue is empty and the kernel service lock for the at least one kernel service of the second interrupt is unavailable, into the worker queue of the first core of the multi-core processor for later execution inside a context-less worker thread; and queue the at least one kernel service request of the second interrupt, in response to determining the worker queue of the first core of the multi-core processor is not empty.

17. The electronic device of claim 15, further configured to:

determine that the kernel service lock for the at least one kernel service request is available;

dequeue the at least one kernel service request from the worker queue;

acquire the kernel service lock for the at least one kernel service request in the context-less worker thread on the first core of the multi-core processor; and execute the at least one kernel service request of the first interrupt inside the context-less worker thread on the first core of the multi-core processor.

18. The electronic device of claim 17, further configured to:

determine that the worker queue is empty; and switch to a task context of a system.

19. The electronic device of claim 15, wherein the multi-core processor executes the queued at least one kernel service requests in the worker queue on behalf of at least one interrupt handler.

* * * * *